United States Patent
Dutu et al.

(10) Patent No.: US 12,190,174 B2
(45) Date of Patent: Jan. 7, 2025

(54) SELECTIVE WORKGROUP WAKE-UP BASED ON SYNCHRONIZATION MECHANISM IDENTIFICATION WITH HIGH CONTENTION SCENARIO

(71) Applicant: Advanced Micro Devices, Inc., Santa Clara, CA (US)

(72) Inventors: Alexandru Dutu, Bellevue, WA (US); Sergey Blagodurov, Bellevue, WA (US); Anthony T. Gutierrez, Bellevue, WA (US); Matthew D. Sinclair, Bellevue, WA (US); David A. Wood, Austin, TX (US); Bradford M. Beckmann, Bellevue, WA (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 0 days.

(21) Appl. No.: 16/425,881

(22) Filed: May 29, 2019

(65) Prior Publication Data
US 2020/0379820 A1    Dec. 3, 2020

(51) Int. Cl.
*G06F 9/52*   (2006.01)
*G06F 9/48*   (2006.01)
*G06F 11/30*  (2006.01)
*G06F 11/34*  (2006.01)

(52) U.S. Cl.
CPC .............. *G06F 9/522* (2013.01); *G06F 9/485* (2013.01); *G06F 11/3024* (2013.01); *G06F 11/3058* (2013.01); *G06F 11/3495* (2013.01)

(58) Field of Classification Search
None
See application file for complete search history.

(56) References Cited

U.S. PATENT DOCUMENTS

| | | | | |
|---|---|---|---|---|
| 5,887,143 A * | 3/1999 | Saito | .................. | G06F 8/458 |
| | | | | 709/200 |
| 6,697,834 B1 * | 2/2004 | Dice | .................. | G06F 9/526 |
| | | | | 718/107 |
| 7,318,128 B1 * | 1/2008 | Dice | .................. | G06F 9/5033 |
| | | | | 711/151 |
| 7,512,950 B1 * | 3/2009 | Marejka | .................. | G06F 9/52 |
| | | | | 718/102 |

(Continued)

*Primary Examiner* — Meng T An
*Assistant Examiner* — Zujia Xu
(74) *Attorney, Agent, or Firm* — Volpe Koenig

(57) ABSTRACT

A technique for synchronizing workgroups is provided. Multiple workgroups execute a wait instruction that specifies a condition variable and a condition. A workgroup scheduler stops execution of a workgroup that executes a wait instruction and an advanced controller begins monitoring the condition variable. In response to the advanced controller detecting that the condition is met, the workgroup scheduler determines whether there is a high contention scenario, which occurs when the wait instruction is part of a mutual exclusion synchronization primitive and is detected by determining that there is a low number of updates to the condition variable prior to detecting that the condition has been met. In a high contention scenario, the workgroup scheduler wakes up one workgroup and schedules another workgroup to be woken up at a time in the future. In a non-contention scenario, more than one workgroup can be woken up at the same time.

17 Claims, 5 Drawing Sheets

(56) References Cited

U.S. PATENT DOCUMENTS

| | | | |
|---|---|---|---|
| 2005/0071529 A1* | 3/2005 | Borkowski | H04L 49/90 710/52 |
| 2009/0271790 A1* | 10/2009 | Williams | G06F 9/3842 718/100 |
| 2014/0149621 A1* | 5/2014 | Han | G06F 9/526 710/200 |
| 2015/0286586 A1* | 10/2015 | Yadav | G06F 12/1466 711/152 |
| 2016/0259796 A1* | 9/2016 | Motik | G06F 16/9024 |
| 2019/0042615 A1* | 2/2019 | Wang | G06F 16/2343 |
| 2019/0356622 A1* | 11/2019 | Song | H04L 51/18 |
| 2020/0211146 A1* | 7/2020 | Uhrenholt | G06F 1/329 |

* cited by examiner

SELECTIVE WORKGROUP WAKE-UP BASED ON SYNCHRONIZATION MECHANISM IDENTIFICATION WITH HIGH CONTENTION SCENARIO

STATEMENT OF GOVERNMENT INTEREST

This invention was made with Government support under PathForward Project with Lawrence Livermore National Security (Prime Contract No. DE-AC52-07NA27344, Subcontract No. B620717) awarded by DOE. The Government has certain rights in this invention.

BACKGROUND

Accelerated processing devices ("APDs") are massively parallel computing devices. Due to the massively parallel nature, meaning that a very large number of execution threads are permitted to be executing concurrently at any given time, some tasks that are relatively simple on more mainstream processors like central processing units ("CPUs") are relatively more difficult on APDs. One such task is synchronization of parallel threads of execution. On CPUs, an operating system typically implements a pre-emptive multi-tasking scheme, whereby an executing thread of execution is "pre-empted" by a scheduling interrupt after a certain amount of execution time, so that a different thread can receive some processing time. Synchronization of threads, such as via a barrier instruction or a synchronization monitor, is relatively trivial in such a scheme, because threads that are stalled at a barrier or monitor are simply not afforded a time-slice in the multi-tasking scheme. Synchronization of threads on an APD, such as via a barrier instruction or a synchronization monitor, is typically more difficult than on a CPU.

BRIEF DESCRIPTION OF THE DRAWINGS

A more detailed understanding can be had from the following description, given by way of example in conjunction with the accompanying drawings wherein.

DETAILED DESCRIPTION

A technique for synchronizing workgroups executing on an accelerated processing device is provided. According to the technique, multiple workgroups execute a wait instruction that specify a condition variable and a condition that is to be met before execution is to proceed. When a workgroup executes a wait instruction, a workgroup scheduler stops execution of the workgroup and an advanced controller begins monitoring the condition variable specified by the wait instruction. When the advanced controller detects that the condition is met, the advanced controller notifies the workgroup scheduler that the condition has been met. In response, the workgroup scheduler determines whether there is a high contention scenario. A high contention scenario occurs when the wait instruction is part of a monitor and is detected by determining that there are multiple waiting workgroups associated with a condition and that there is a low number (a number below or equal to a predetermined threshold, such as 1) of updates to the condition variable prior to detecting that the condition has been met. A low contention scenario occurs when there is only one waiter associated with a condition variable. Cases where there are multiple workgroups waiting for one condition and multiple updates to the condition variable are detected before the condition is met are considered non-contending cases. One example of a non-contending case is a global barrier. In a high contention scenario, the workgroup scheduler wakes up one workgroup and schedules another workgroup to be woken up at a time in the future equal to an estimated time for completion of the critical section associated with the monitor. In a non-contending scenario, more than one workgroup can be woken up at the same time. Additional details are provided elsewhere herein.

Figure 1:
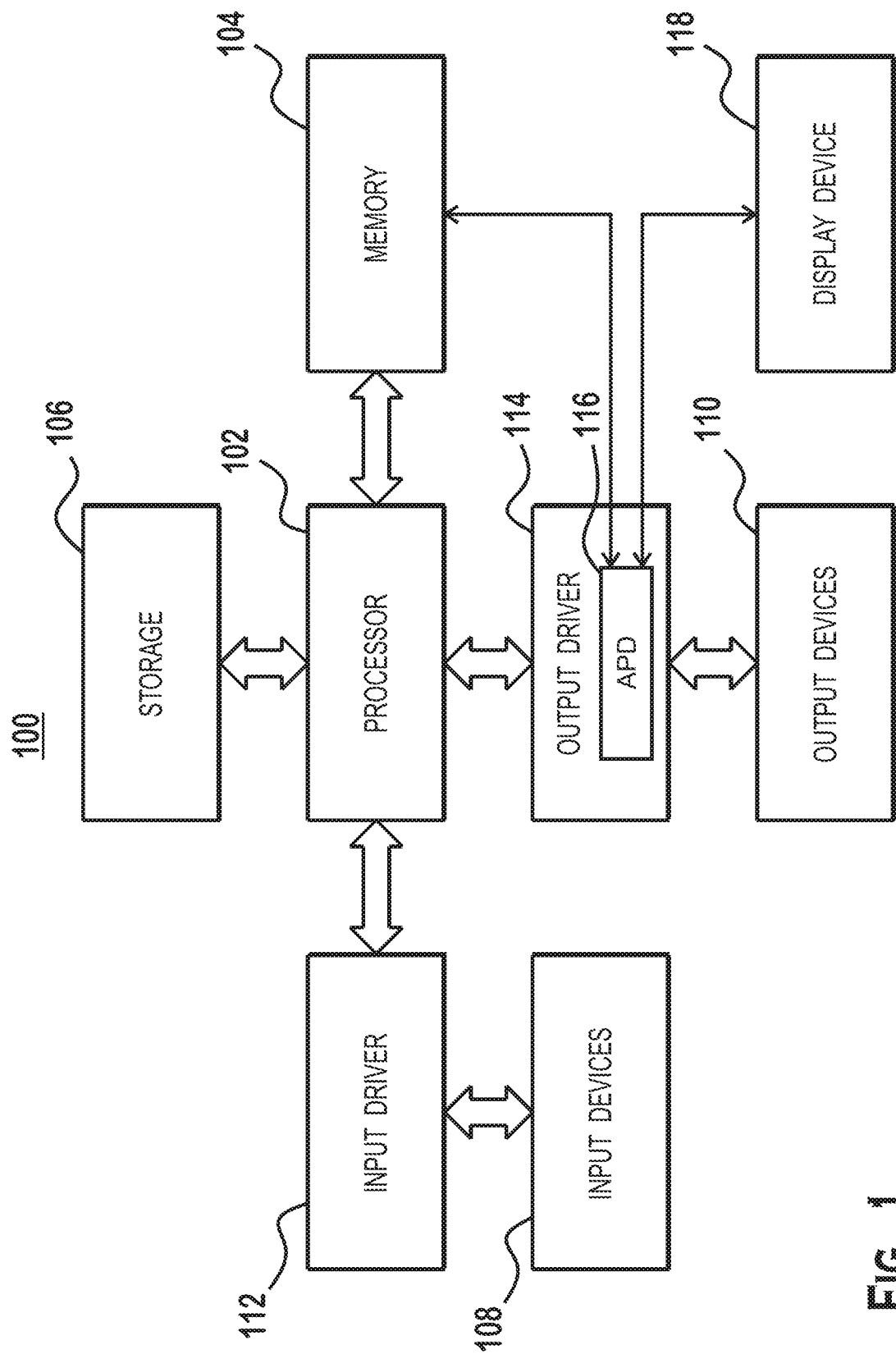
FIG. 1 is a block diagram of an example device in which one or more features of the disclosure can be implemented.

FIG. 1 is a block diagram of an example device 100 in which one or more features of the disclosure can be implemented. The device 100 could be one of, but is not limited to, for example, a computer, a gaming device, a handheld device, a set-top box, a television, a mobile phone, a tablet computer, or other computing device. The device 100 includes a processor 102, a memory 104, a storage 106, one or more input devices 108, and one or more output devices 110. The device 100 also includes one or more input drivers 112 and one or more output drivers 114. Any of the input drivers 112 are embodied as hardware, a combination of hardware and software, or software, and serve the purpose of controlling input devices 112 (e.g., controlling operation, receiving inputs from, and providing data to input drivers 112). Similarly, any of the output drivers 114 are embodied as hardware, a combination of hardware and software, or software, and serve the purpose of controlling output devices 114 (e.g., controlling operation, receiving inputs from, and providing data to output drivers 114). It is understood that the device 100 can include additional components not shown in FIG. 1.

In various alternatives, the processor 102 includes a central processing unit (CPU), a graphics processing unit (GPU), a CPU and GPU located on the same die, or one or more processor cores, wherein each processor core can be a CPU or a GPU. In various alternatives, the memory 104 is located on the same die as the processor 102, or is located separately from the processor 102. The memory 104 includes a volatile or non-volatile memory, for example, random access memory (RAM), dynamic RAM, or a cache.

The storage 106 includes a fixed or removable storage, for example, without limitation, a hard disk drive, a solid state drive, an optical disk, or a flash drive. The input devices 108 include, without limitation, a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 include, without limitation, a display, a speaker, a printer, a haptic feedback device, one or more lights, an antenna, or a network connection (e.g., a wireless local area network card for transmission and/or reception of wireless IEEE 802 signals).

The input driver 112 and output driver 114 include one or more hardware, software, and/or firmware components that are configured to interface with and drive input devices 108 and output devices 110, respectively. The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. The output driver 114 includes an accelerated processing device ("APD") 116 which is coupled to a display device 118, which, in some examples, is a physical display device or a simulated device that uses a remote display protocol to show output. The APD 116 is configured to accept compute commands and graphics rendering commands from processor 102, to process those compute and graphics rendering commands, and to provide pixel output to display device 118 for display. As described in further detail below, the APD 116 includes one or more parallel processing units configured to perform computations in accordance with a single-instruction-multiple-data ("SIMD") paradigm. Thus, although various functionality is described herein as being performed by or in conjunction with the APD 116, in various alternatives, the functionality described as being performed by the APD 116 is additionally or alternatively performed by other computing devices having similar capabilities that are not driven by a host processor (e.g., processor 102) and configured to provide graphical output to a display device 118. For example, it is contemplated that any processing system that performs processing tasks in accordance with a SIMD paradigm may be configured to perform the functionality described herein. Alternatively, it is contemplated that computing systems that do not perform processing tasks in accordance with a SIMD paradigm performs the functionality described herein.

Figure 2:
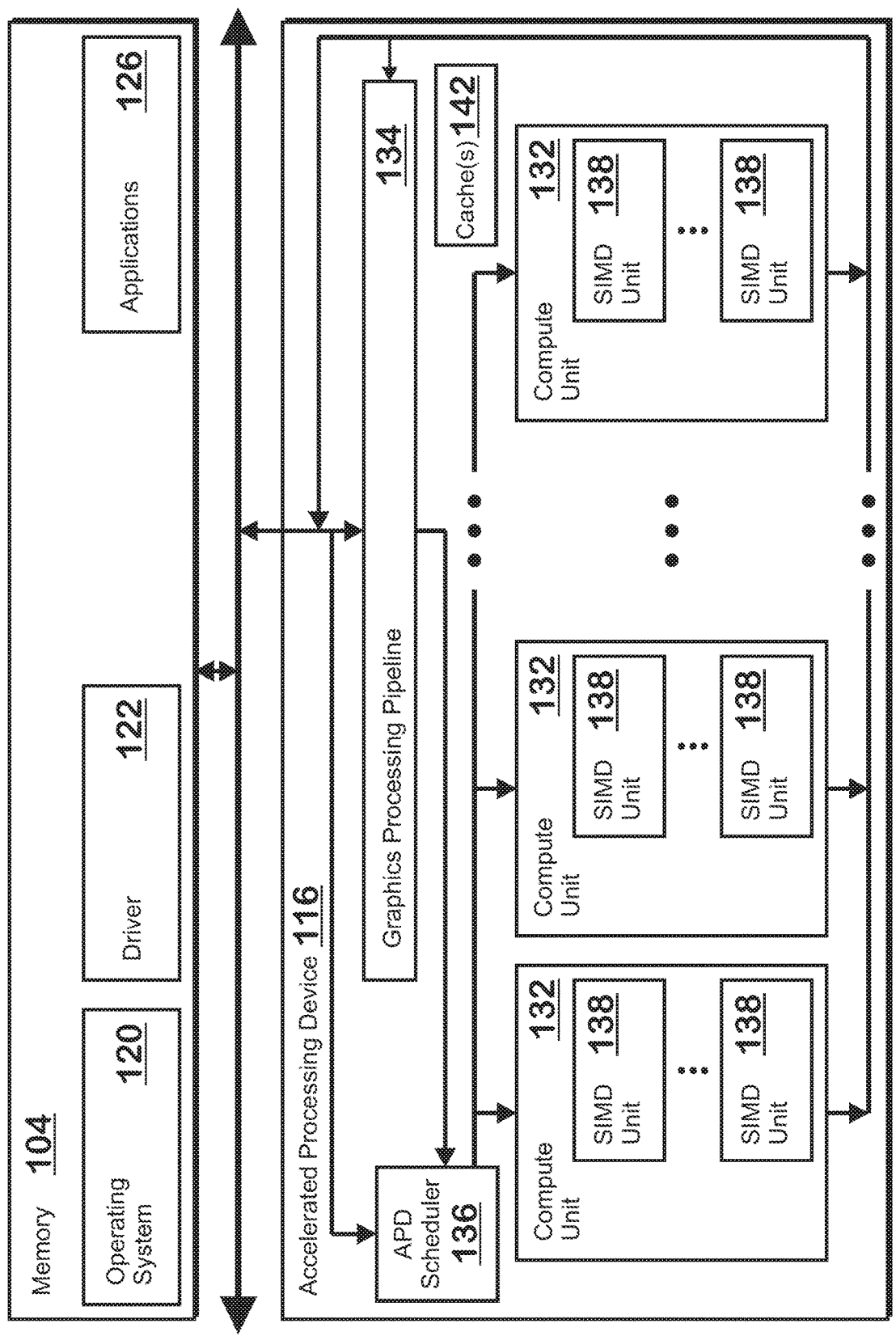
FIG. 2 illustrates details of the device of FIG. 1, according to an example.

FIG. 2 illustrates details of the device 100 and the APD 116, according to an example. The processor 102 (FIG. 1) executes an operating system 120, a driver 122, and applications 126, and may also execute other software alternatively or additionally. The operating system 120 controls various aspects of the device 100, such as managing hardware resources, processing service requests, scheduling and controlling process execution, and performing other operations. The APD driver 122 controls operation of the APD 116, sending tasks such as graphics rendering tasks or other work to the APD 116 for processing. The APD driver 122 also includes a just-in-time compiler that compiles programs for execution by processing components (such as the SIMD units 138 discussed in further detail below) of the APD 116.

The APD 116 executes commands and programs for selected functions, such as graphics operations and non-graphics operations that may be suited for parallel processing. The APD 116 can be used for executing graphics pipeline operations such as pixel operations, geometric computations, and rendering an image to display device 118 based on commands received from the processor 102. The APD 116 also executes compute processing operations that are not directly related to graphics operations, such as operations related to video, physics simulations, computational fluid dynamics, or other tasks, based on commands received from the processor 102.

The APD 116 includes compute units 132 that include one or more SIMD units 138 that are configured to perform operations at the request of the processor 102 (or another unit) in a parallel manner according to a SIMD paradigm. The SIMD paradigm is one in which multiple processing elements share a single program control flow unit and program counter and thus execute the same program but are able to execute that program with different data. In one example, each SIMD unit 138 includes sixteen lanes, where each lane executes the same instruction at the same time as the other lanes in the SIMD unit 138 but can execute that instruction with different data. Lanes can be switched off with predication if not all lanes need to execute a given instruction. Predication can also be used to execute programs with divergent control flow. More specifically, for programs with conditional branches or other instructions where control flow is based on calculations performed by an individual lane, predication of lanes corresponding to control flow paths not currently being executed, and serial execution of different control flow paths allows for arbitrary control flow.

The APD 116 includes one or more caches 142 that are accessible to the compute units 132. The caches 142 implement a cache coherent protocol to allow data stored in any individual cache 142 to be accessible to any of the compute units 132.

The parallelism afforded by the compute units 132 is suitable for graphics related operations such as pixel value calculations, vertex transformations, and other graphics operations. Thus in some instances, a graphics pipeline 134, which accepts graphics processing commands from the processor 102, provides computation tasks to the compute units 132 for execution in parallel.

The compute units 132 are also used to perform computation tasks not related to graphics or not performed as part of the "normal" operation of a graphics pipeline 134 (e.g., custom operations performed to supplement processing performed for operation of the graphics pipeline 134). An application 126 or other software executing on the processor 102 transmits programs "kernels") that define such computation tasks to the APD 116 for execution.

The basic unit of execution in compute units 132 is a work-item. Each work-item represents a single instantiation of a program (also sometimes referred to as a "kernel") that is to be executed in parallel in a particular lane. Work-items can be executed simultaneously (or partially simultaneously and partially sequentially) as a "wavefront" on a single SIMD processing unit 138. One or more wavefronts are included in a "workgroup," which includes a collection of work-items designated to execute the same program. A work group can be executed by executing each of the wavefronts that make up the work group. In alternatives, wavefronts are executed on a single SIMD unit 138 or on different SIMD units 138. An APD scheduler 136 is configured to perform operations related to scheduling various workgroups and wavefronts on compute units 132 and SIMD units 138. In an example of usage, an application 126 indicates to the APD 116 the manner in which to execute a kernel, in terms of the "size" of an execution of the kernel, where "size" indicates the number of work-items. In some modes of operation, the application 126 also specifies how work-items are divided into workgroups. In other modes of operation, the APD 116 and/or driver 122 determines how to divide the work-items into workgroups. The workgroups specified are executed by the APD 116. The APD scheduler 136 assigns each different workgroup to a compute unit 132 based on the availability of computing resources (e.g., how many workgroups are assigned to a particular compute unit 132, and whether other resources, such as memory, registers, or other resources are available).

The term "synchronization" means allowing one or more parallel threads of execution (here, workgroups) to continue execution only once a condition has been met. One example of synchronization is a barrier instruction. With a barrier instruction, no parallel threads of execution participating in the barrier instruction can proceed past the barrier instruction until all of the parallel threads of execution participating in the barrier instruction have executed the barrier instruction. Another example of synchronization is a synchronization monitor. With a synchronization monitor, access to a critical section is guarded by mutual exclusion and by a condition variable. More specifically, a mutual exclusion object allows only one of the parallel threads of execution to execute the critical section at a given time. Additionally, when a parallel thread of execution arrives at a critical section and a precondition for execution of the critical section is not met, the parallel thread of execution waits until the condition is met. The condition is reflected in a condition variable stored in memory. The condition is considered to be met when the condition variable is set to a value that is deemed to meet the condition and is considered not to be met when the condition variable is set to a value that is not deemed to meet the condition.

FIGS. 3A-3D illustrate alternative implementations of systems for implementing synchronization among workgroups. Each implementation includes at least one advanced controller 306 and at least one workgroup scheduler 308 integrated within a cache controller 304 of one or more caches 142 or external to but in communication with a cache controller 304 of one or more caches 142.

In general, the advanced controller 306 and workgroup scheduler 308 cooperate to achieve synchronization for different workgroups in the following manner. The advanced controller 306 receives an indication when all work-items of all wavefronts of a workgroup execute a special instruction referred to herein as a wait instruction. At this point, the workgroup scheduler 308 stops execution of the workgroup and an advanced controller 306 begins monitoring the condition variable. The condition is that the value stored in a specified condition variable meets some condition. Some example conditions include that the condition variable value is greater than a specified value, is less than a specified value, or is equal to a specified value. Other conditions may alternatively be used.

As just stated, upon detecting execution of the wait instruction, the workgroup scheduler stops the workgroup. Stopping the workgroup includes either stalling the workgroup or context-switching the workgroup out of the compute unit 132 on which the workgroup is running. Stalling a workgroup involves pausing forward progress of the workgroup past the wait instruction. Context-switching the workgroup involves saving the state for the workgroup (where this "state" includes the instruction pointer address, the working data such as data stored in registers, and any other data that indicates the working status of execution of the workgroups). The workgroup scheduler decides whether to stall or context switch out a workgroup based on the number of other workgroups waiting to be executed and the available resources. In some examples, if the amount of available resources is sufficient to execute all ready (to start or resume execution) workgroups, then the workgroup scheduler stalls the workgroups that execute the wait instruction. In these examples, if the amount of available resources is insufficient to execute all waiting workgroups, then the workgroup scheduler context-switches out the workgroups that execute the wait instruction. A workgroup is considered ready to start or resume execution when the workgroup has not yet started execution, the workgroup has started execution and was switched out through kernel level pre-emptive scheduling or when the workgroup has been waiting on a condition and the waiting condition has been met.

It should be noted that multiple workgroups may execute a wait instruction specifying the same condition variable and same condition. In such situations, multiple workgroups would be waiting for the condition to be satisfied.

When an advanced controller 306 detects that the condition is met, the advanced controller 306 informs a workgroup scheduler 308 that the condition has been satisfied. The workgroup scheduler 308 then determines the number of workgroups to resume execution based on the deduced nature of the wait instruction (i.e., whether the wait instruction is part of a high contention scenario or a non-contention scenario). Specifically, if the wait instruction is deduced to be part of a high contention scenario, then the workgroup scheduler 308 wakes up only a single workgroup and schedules wake-up of another single workgroup at a point in the future equal to an estimated amount of time of completion of the critical section. If the wait instruction is deduced to be part of a non-contention scenario, then the workgroup scheduler 308 wakes up one or more, up to all, of the waiting workgroups. In some situations, the workgroup scheduler 308 schedules a number of waiting workgroups to be woken up at different future times.

In one implementation, the workgroup scheduler 308 deduces that the wait instruction is part of a non-contention scenario by determining the number of updates to the condition variable until the condition is met and the number of waiting workgroups. For example, it is typical to implement a global barrier by having all threads participating in the barrier either increment or decrement a value and detecting that the barrier is satisfied when the barrier reaches a certain value like 0 or like the number of threads participating in the barrier. Thus if there are many updates to the condition variable, then the workgroup scheduler 308 deduces that the wait instruction is part of a barrier. On the other hand, the condition for a synchronization primitive in a high contention scenario is typically updated only once or only a few times before being satisfied, as such a condition is typically treated as a signal that some other work has been completed. Thus if there are not many updates to the condition variable and there are many workgroups waiting on the same condition, then the workgroup scheduler 308 deduces that the wait instruction is a part of a high contention scenario. It should be understood that the number of times is measured from the time the advanced controller 306 begins monitoring the condition variable to the time the condition variable is satisfied. The determination of whether "many" updates have occurred is based on whether the number of updates is greater than a pre-determined threshold. In some examples, the threshold is one. Thus, in case there are multiple workgroups waiting on a condition, if there is more than one update to the condition variable before the condition variable is satisfied, then the wait instruction is deduced to be part of a non-contention scenario and if there is only one update to the condition variable for the condition to be satisfied, then the wait instruction is deduced to be part of a high contention scenario. Any other threshold could be used.

The estimated amount of time for completion of the critical section may be determined in any technically feasible manner. In one example, the workgroup scheduler 308 records the amount of time between when a workgroup is context switched out or stalled, as a result of executing a wait instruction, and when the waiting condition specified by the wait instruction is met. The workgroup scheduler 308 records multiple instances of this timing measurement and derives an estimated amount of time for completion of a critical section based on these measurements. In an example, this derivation is accomplished by averaging such measurements for multiple instances of executing a wait instruction and having the wait condition satisfied for the first workgroup waiting for a particular condition.

FIGS. 3A-3D provide several example hardware configurations for a system for intelligently providing synchronization between workgroups. In general, the hardware configurations differ in the placement of the advanced controller 306 and the workgroup scheduler 308 relative to the caches 142, as well as the correspondence between the advanced controller 306, workgroup scheduler 308, and the cache controller 304.

Figure 3A:
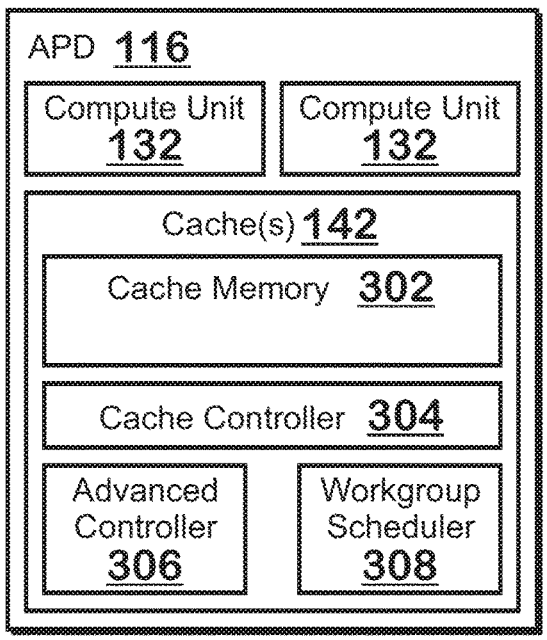
FIGS. 3A-3D provide several example hardware configurations for a system for intelligently providing synchronization between workgroups.
Figure 3B:
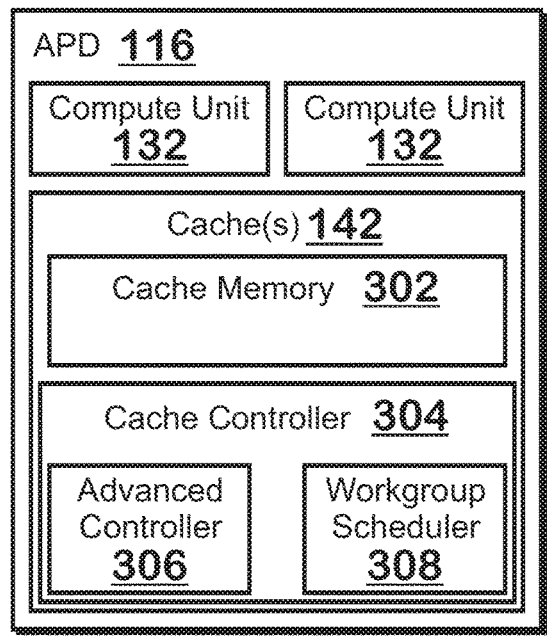

In FIG. 3A, the advanced controller 306 and the workgroup scheduler 308 are external to the cache controller 304 of the caches 142. The cache controller 304 is an element of a cache that accepts requests to access the data stored in the cache memory 302 (e.g., reads or writes) and accesses the individual banks, sets, and ways appropriately. The cache controller 304 may also implement cache coherence protocols and provide other advanced services. In the example of FIG. 3A, the advanced controller 306 and workgroup scheduler 308 are external to, but in communication with, the cache controller 304. In FIG. 3B, the advanced controller 306 and the workgroup scheduler 308 are integrated within the cache controller 304.

Figure 3C:
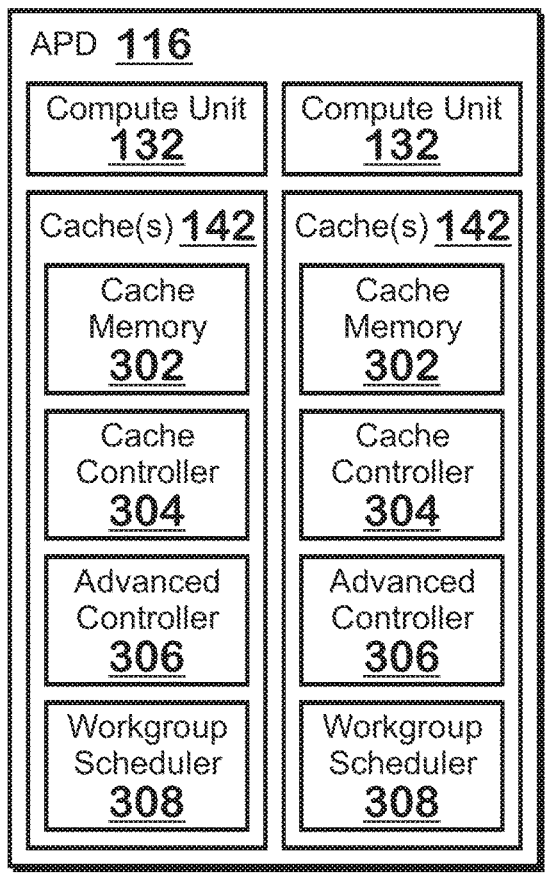
Figure 3D:
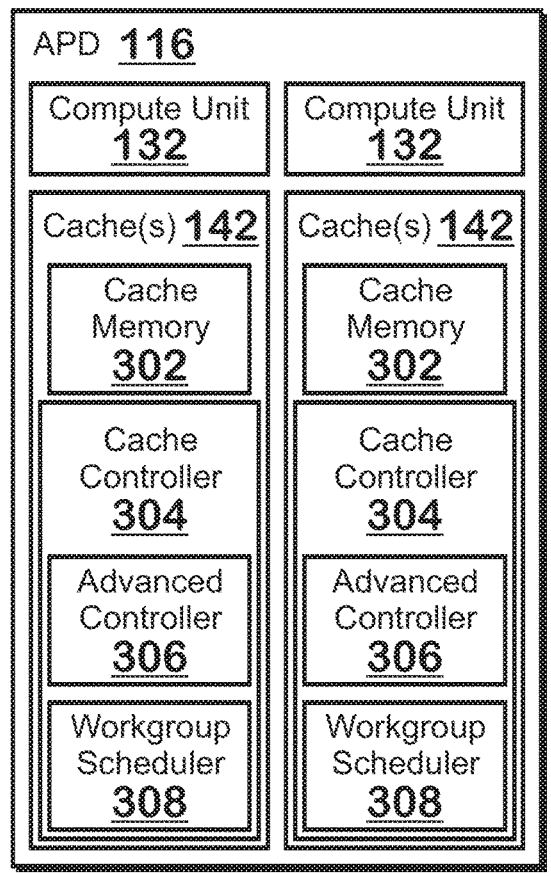

FIGS. 3C and 3D illustrate examples where there are multiple advanced controllers 306 and workgroup schedulers 308 in the APD 116. FIG. 3C illustrates an example where the advanced controllers 306 and workgroup schedulers 308 are external to the cache controllers 304 and FIG. 3D illustrates an example where the advanced controllers 306 and workgroup schedulers 308 are internal to the cache controllers 304.

FIGS. 3A and 3B illustrate "single instance" examples and FIGS. 3C and 3D illustrate "multiple instance" examples. In the single instance examples, there is one advanced controller 306 and one workgroup scheduler 308 per APD 116. In the multiple instance examples, there are multiple advanced controller 306 and/or multiple workgroup schedulers 308. In some examples, there are multiple caches 142 and there is one advanced controller 306 and one workgroup scheduler 308 per cache 142. In other examples, there is one or more cache and there is one advanced controller 306 and one workgroup scheduler 308 per bank in the caches 142. Other correspondences between number of workgroup schedulers 308 and advanced controllers 306 and number of caches 142 and/or banks are possible as well.

In the multiple instance examples, each workgroup scheduler 308 and advanced controller 306 is responsible for condition variables stored in the portion of the caches 142 associated with that workgroup scheduler 308 and advanced controller 306. For example, if there is one workgroup scheduler 308 and advanced controller 306 per cache 142, then the workgroup scheduler 308 and advanced controller 306 that monitors condition variables for workgroups that have been stopped (either stalled or context switched out), and performs other tasks related to monitoring and waking the workgroups, is the workgroup scheduler 308 and advanced controller 306 that is assigned to the portion of the cache 142 that contains that condition variable.

In an example, the caches 142 include two caches—cache 1 and cache 2. Each cache has two banks Cache 1 has bank 1 and bank 2 and cache 2 has bank 3 and bank 4. In this example, workgroups execute a wait instruction, setting a condition to wait for as variable x being equal to 0. Due to variable x being stored in bank 3, the workgroup scheduler 308 and advanced controller 306 associated with bank 3 perform the steps described herein including context switching out or stalling the workgroups that execute the wait instruction for variable x, detecting that the wait condition is met, measuring the time from context-switching out workgroups until the condition is met for the purpose of determining an estimated time of completion of the critical section, determining whether the wait instruction is part of a high contention or non-contention scenario, and resuming workgroups accordingly. Having multiple workgroup schedulers 308 and advanced controllers 306 allows processing for multiple condition variables to be processed in parallel.

In some examples, detection of whether the condition has been met occurs as follows. When the advanced controller 306 detects a wait instruction targeting a particular memory address that is associated with that advanced controller 306, the advanced controller 306 begins monitoring the cache line that stores the data at that memory address. When the advanced controller 306 detects that the cache line has been updated with a new value, the advanced controller 306 checks if any waiting condition has been satisfied, and if a condition has been met, the advanced controller 306 informs the workgroup scheduler 308 of this event.

It is possible for multiple workgroup schedulers 308 to be concurrently tracking multiple condition variables. It is also possible for each individual workgroup scheduler 308 to be concurrently tracking multiple condition variables.

Figure 4A:
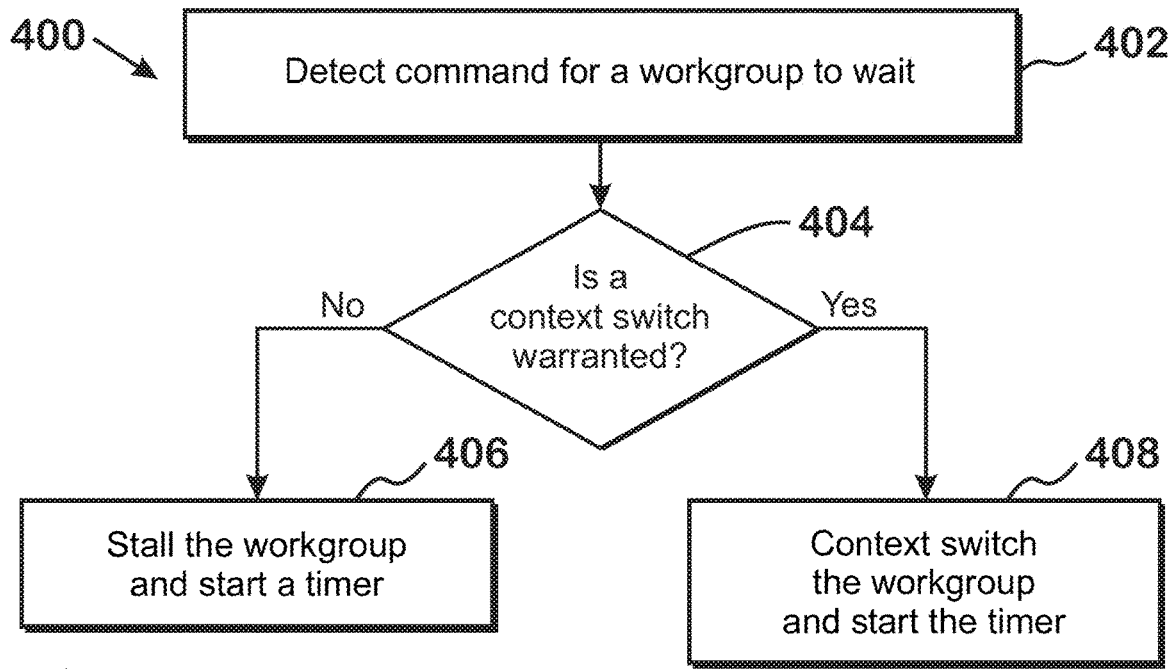
FIGS. 4A and 4B illustrate example methods for stopping and resuming execution of workgroups that execute a wait instruction.
Figure 4B:
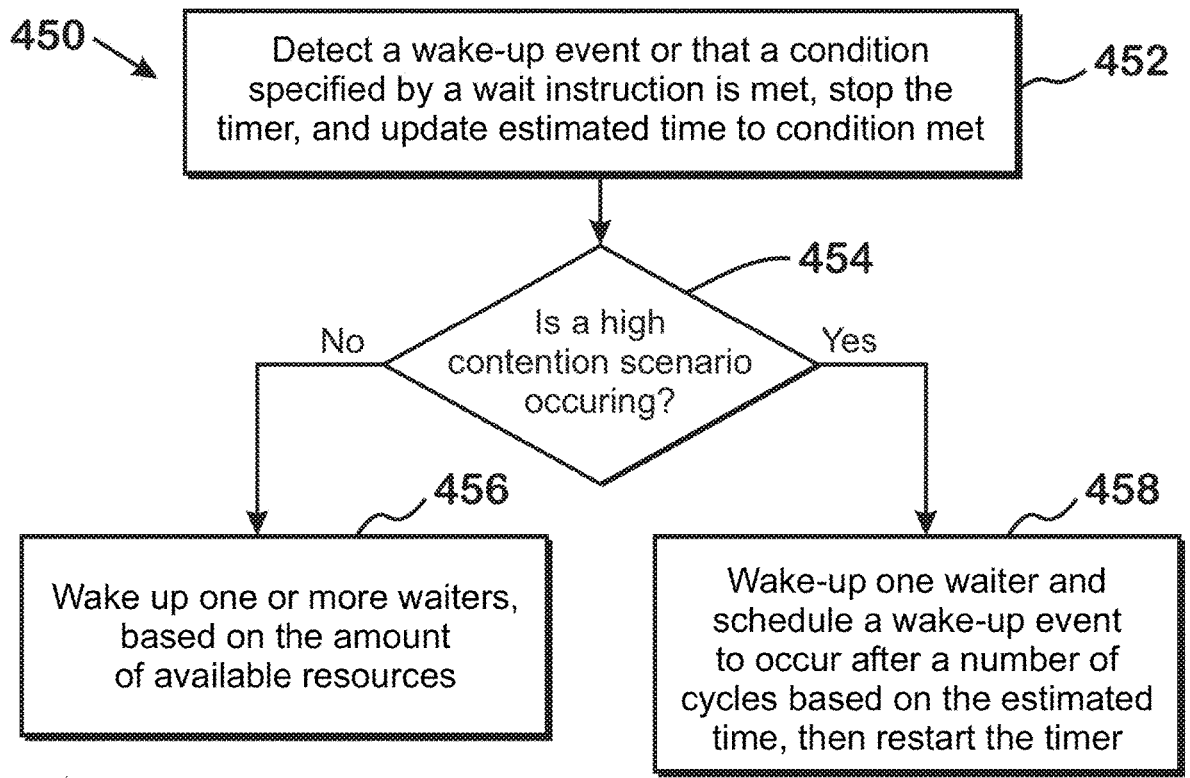

FIGS. 4A and 4B illustrate example methods for stopping and resuming execution of workgroups that execute a wait instruction. Although described with respect to the systems illustrated in FIGS. 1-3D, those of skill in the art will recognize that any system configured to execute the steps of FIGS. 4A and 4B in any technically feasible order falls within the scope of the present disclosure.

The method 400 illustrated in FIG. 4A begins at step 402, where the advanced controller 306 detects that a workgroup has executed a wait instruction. This detection occurs when all wavefronts (and thus all work-items in all wavefronts) of the workgroup have executed the wait instruction, since wavefronts do not necessarily execute in a time-synchronized manner. The wait instruction specifies a condition variable, which is stored at a particular memory location, as well as a condition that must be satisfied (or "met") before the workgroup is woken up. Any technically feasible condition is possible. In one example, the wait instruction is part of a barrier, where each other workgroup participating in the barrier must arrive at and execute the wait instruction before any workgroup participating in the barrier is allowed to execute past the barrier. In such an example, the condition variable may serve as a counter or other indicator of the number of workgroups that have arrived at the barrier. When the condition variable is set to a specific value, such as zero or being equal to the number of workgroups participating in the barrier, the condition is deemed to be met. In other examples, the condition variable is part of a mutual exclusion synchronization primitive in which only one workgroup is allowed to execute in a critical section at a given time. In this scenario, the condition variable acts as a signal indicating whether a workgroup is executing the critical section. When a workgroup executes the critical section, the condition variable is set to a value indicating that the critical section is not available to be executed by any other workgroup. It is possible to use the condition variable to prevent progress into the critical section by any workgroup until some external condition is met, such as receiving a signal from a different workgroup, from a processor external to the APD 116, or from an input/output device. Thus, in such a scenario, initially, no workgroup is allowed to execute the critical section until the condition is set to be met by such external processor or device. The condition variable may be set to indicate that the critical section is available by one of the workgroups participating in synchronization, as an initial condition, or by an external actor. The condition specified by the wait instruction is considered to be met when the condition variable is set to the value indicating that the critical section is available to be executed.

At step 404, the advanced controller 306 signals to the workgroup scheduler 308 that the wait instruction has been executed. The workgroup scheduler 308 determines whether the workgroup that executed the wait instruction should be context switched out or should be stalled. Being context switched out means that the hardware resources used by the workgroup are freed for use by other workgroups and the state for the workgroup that executed the wait instruction is saved so that the workgroup may be context switched back in at a later time. State generally includes values stored in hardware resources that pertain to execution of the workgroup. Some examples of state include values in registers, values in local memory, the instruction pointer, the predication mask, and any may alternatively or additionally include other values stored in hardware resources that pertain to the execution of the workgroup. Stalling a workgroup means pausing execution of the workgroup but not freeing the hardware resources used by the workgroup. Recovery from stalling is faster than recovery from context-switching, because with stalling, execution of the workgroup simply needs to be un-paused, whereas with context-switching, the state needs to be loaded back into the hardware used to execute the workgroup. The decision, at step 404, of whether a context switch is warranted, is based on whether hardware resources are needed to execute other workgroups that are ready to be executed but are not executing due to there being no free resources for use by such workgroups. In an example, the execution resources of the APD 116 are fully in use by currently executing workgroups and several other workgroups are ready to be executed but are not being executed by the APD 116. In this example, the workgroup scheduler 308 context-switches out the workgroup that executed the wait instruction, to allow other workgroups to use the hardware resources in use by the workgroup that executed the wait instruction. In another example, there are no waiting workgroups or there is a sufficient amount of hardware resources to allow execution of all waiting workgroups. In this example, the workgroup scheduler 308 causes the workgroup that executed the wait instruction to stall instead of being context switched out. It should be understood that the above are simply examples and that the workgroup scheduler 308 may use other techniques, including more sophisticated techniques, for determining whether to stall a workgroup or context switch out the workgroup. For example, the workgroup scheduler 308 may use estimated time before the condition is satisfied to determine that a workgroup may be stalled instead of context-switched out because the estimated time to completion is very short, may use relative priorities of workgroups to determine that a workgroup may be stalled instead of context-switched (or context-switched instead of stalled), or may refer to other factors to determine whether to context-switch out or stall a workgroup.

If the workgroup scheduler 308 determines that the workgroup is to be context-switched out, then the method 400 proceeds to step 408, where the workgroup scheduler 308 context-switches out the workgroup and starts a timer for measurement of the time for completion of the critical section (assuming that no timer for the condition variable is currently running—if such a timer is running, this means that another workgroup has already been stopped). If the workgroup scheduler 308 determines that the workgroup is not to be context-switched out, then the method 400 proceeds to step 406, where the workgroup scheduler 308 stalls the workgroup and starts the timer.

The method 450 of FIG. 4B begins upon detection of a wake-up event or detection that a condition specified by a wait instruction is met. In response to this detection, the workgroup scheduler 308 stops the timer and updates the estimated time until the condition is met. In the situation that no estimated time until the condition is met has yet been generated, the workgroup scheduler 308 sets this estimated time to be equal to the value of the timer at the time the timer is stopped. Any technically feasible technique for updating the estimated time may be used. In an example, the previous estimated value is averaged with the value of the time at the time the timer is stopped.

At step 454, the workgroup scheduler 308 determines whether a high content scenario is occurring. A high contention scenario is a scenario in which the condition variable is guarding a critical section, since only one workgroup can execute in the critical section. In this situation, multiple workgroups would "content" for the ability to execute in the critical section. A low contention scenario is one in which there is only one waiting workgroup for a condition variable. A non-contention scenario is one in which all waiters are woken. This situation is non-contention because, there is no critical section in this scenario. For example, a synchronization primitive which exhibits a non-contention scenario is a global barrier—each workgroup participating in a global barrier may proceed past the barrier once each workgroup has arrived at the barrier. In some implementations, the workgroup scheduler 308 determines whether a scenario is high contention or non-contention based on the number of updates to the condition variable before the condition is deemed satisfied. With mutual exclusion synchronization primitives, only one update to the condition variable typically occurs for the condition to be satisfied, as such an update is a signal from one entity to the waiting workgroups that one of the waiting workgroups is allowed to proceed. With global barriers, multiple updates to the condition variable typically occur, such as where each workgroup that arrives at the barrier increments or decrements the condition variable. Thus, in some examples, determining whether the scenario is a high contention scenario or a non-contention scenario involves determining whether the number of updates to the condition variable that occurs is greater than a threshold (which in some examples is 1). If the number is greater than the threshold, then the workgroup scheduler 308 determines that a high contention scenario is not occurring. If the number is not greater than the threshold, then the workgroup scheduler 308 determines that a high contention scenario is occurring. If a high contention scenario is occurring, then the method 450 proceeds to step 458 and if a high contention scenario is not occurring, then the method 450 proceeds to step 456.

At step 456, because the scenario is not high contention, the workgroup scheduler 308 wakes up one or more waiters, based on the amount of available resources. In some situations, the number of waiting workgroups is greater than one, and the amount of resources available would support execution of all of those waiting workgroups. In such situations, the workgroup scheduler 308 wakes up all waiting workgroups. In other situations, the number of waiting workgroups is greater than one, and the amount of resources available would support execution of less than all of those waiting workgroups. In such situations, the workgroup scheduler 308 wakes up as many waiting workgroups as can be executed and causes the other waiting workgroups to be woken up when resources become available for execution of those other workgroups. In yet other situations, the number of waiting workgroups is equal to one and the amount of resources available would support execution of that workgroup. In that situation, the workgroup scheduler 308 wakes up that workgroup. In still other situations, the number of waiting workgroups is equal to one and there are insufficient resources to support execution of that workgroup. In that situation, the workgroup scheduler 308 wakes up the one workgroup when resources become available for execution of that workgroup.

Referring back to the high contention scenario, at step 458, the workgroup scheduler 308 wakes up one of the waiting workgroups and schedules a second waiting workgroup to be woken up at a future time, based on the estimated time to completion of the critical section. The workgroup scheduler 308 does not wake up more than one workgroup in a high contention scenario because doing so would result in one or more of those workgroups stalling anyway, since only one workgroup can execute in the critical section. The workgroup scheduler 308 schedules the second workgroup to be woken up at the future time based on the estimated time to completion of the critical section because this allows the second workgroup to be woken up when that second workgroup would be presumed to be permitted to enter the critical section. The second workgroup remains in a waiting state before this time, because waking the second workgroup while the first workgroup is executing the critical section would result in the second workgroup being put back to sleep anyway, which would represent a waste of processing resources. In addition to waking up the first workgroup and scheduling wake-up of the second workgroup (by scheduling a "wake-up event" to occur at the specified time), the workgroup scheduler 308 also restarts the timer used for estimating the time to completion of the critical section, so that the measurement of the time for the first workgroup to complete the critical section can be used to update the estimated time for completion of the critical section at step 452 when the wake-up event triggers execution of that step. It should be understood that the method 450 executes both when the condition is met and also when the wake-up event, scheduled at step 458, occurs.

Figure 5:
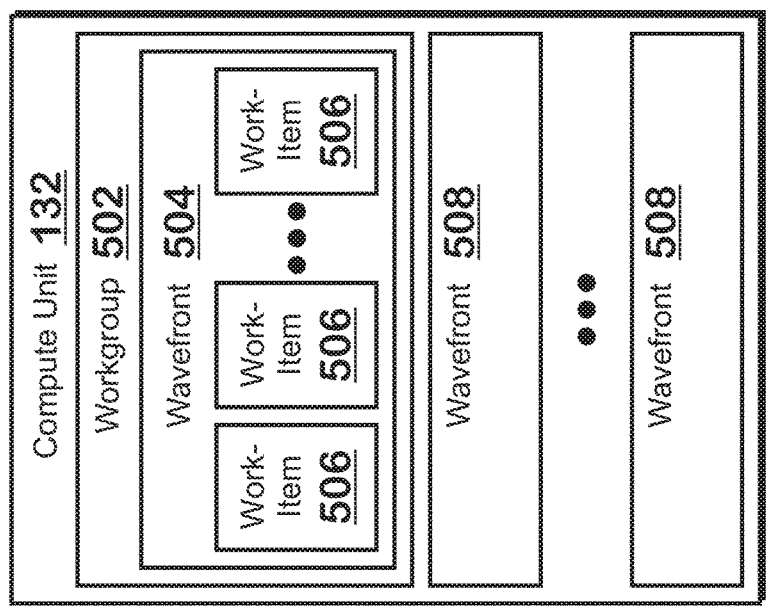
FIG. 5 illustrates an example workgroup executing in a compute unit, according to an example.

FIG. 5 illustrates an example workgroup 502 executing in a compute unit 132, according to an example. A workgroup 502 is confined to a compute unit 132, meaning that the wavefronts 504 that comprise the workgroup 502 all execute within a single compute unit 132. Work-items 506 represent individual threads of execution. Wavefronts 504 include multiple work-items 506 that execute in parallel in a SIMD manner on the SIMD units 138 of the compute units 132. A workgroup 502 is executed by executing each of the wavefronts 504 that comprise the workgroup 502.

Figure 6:
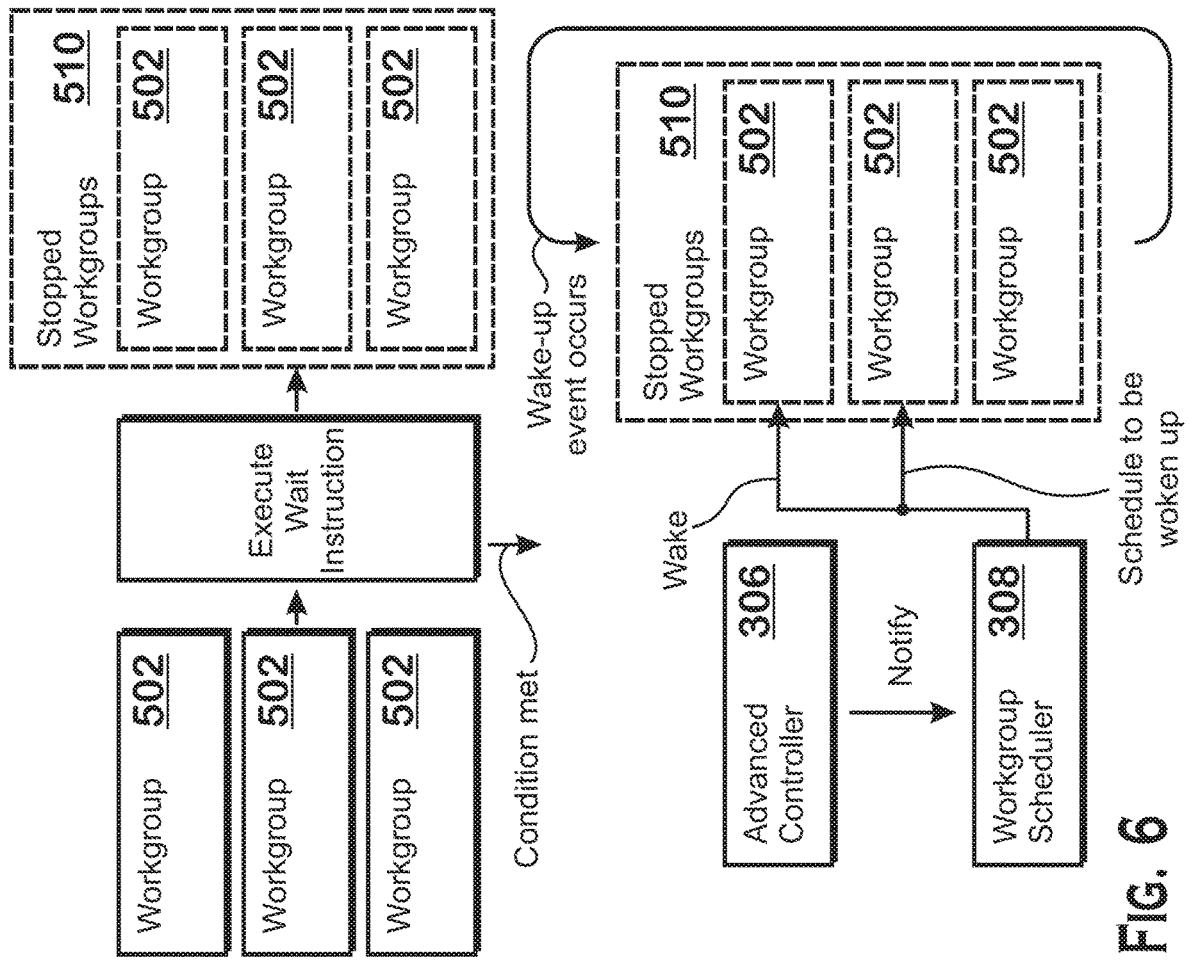
FIG. 6 illustrates some features of a technique for scheduling workgroups using condition variables, according to an example.

FIG. 6 illustrates some features of a technique for scheduling workgroups using condition variables, according to an example. As shown, several workgroups 502 execute a wait instruction and are stopped after executing the wait instruction (where stopped means either stalled or context-switched out, as described elsewhere herein). At some point, the advanced controller 306 detects that the condition has been met by examining the cache memory 302. In response, the advanced controller 306 notifies the workgroup scheduler 308 that the condition has been met, and the workgroup scheduler 308 wakes one of the stopped workgroups (where "wakes" means either resuming execution of a stalled workgroup or context-switching in a workgroup that has been context-switched out). The workgroup scheduler 308 also schedules a second workgroup 502 to be woken up at a time based on the estimated completion time for the critical section.

It should be understood that many variations are possible based on the disclosure herein. Although features and elements are described above in particular combinations, each feature or element can be used alone without the other features and elements or in various combinations with or without other features and elements.

The various functional units illustrated in the figures and/or described herein (including, but not limited to, the processor 102, the input driver 112, the input devices 108, the output driver 114, the output devices 110, the accelerated processing device 116, the scheduler 136, the graphics processing pipeline 134, the compute units 132, the SIMD units 138, the advanced controller 306, the workgroup scheduler 308, or the cache controller 304) may be implemented as a general purpose computer, a processor, or a processor core, or as a program, software, or firmware, stored in a non-transitory computer readable medium or in another medium, executable by a general purpose computer, a processor, or a processor core. The methods provided can be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors can be manufactured by configuring a manufacturing process using the results of processed hardware description language (HDL) instructions and other intermediary data including netlists (such instructions capable of being stored on a computer readable media). The results of such processing can be maskworks that are then used in a semiconductor manufacturing process to manufacture a processor which implements features of the disclosure.

The methods or flow charts provided herein can be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:

1. A method for scheduling on an accelerated processing device ("APD"), the method comprising:
    detecting execution of a wait instruction by each workgroup of a plurality of workgroups, wherein the wait instruction causes each workgroup of the plurality of workgroups to be in a waiting state, wherein the wait instruction executed by each workgroup of the plurality of workgroups specifies a condition variable and a condition to be met for the condition variable, wherein the condition variable and the condition of the wait instruction are the same for each workgroup;

monitoring the condition variable to detect when the condition is met;

in response to the condition being met as a result of only a single update to the condition variable after the wait instruction is executed by any workgroup of the plurality of workgroups, updating an estimated time of completion of a respective critical section associated with a synchronization primitive associated with the condition variable to completion of the critical section when the condition is met, and detecting that the plurality of workgroups is part of a high contention scenario indicating a mutual exclusion synchronization primitive;

while each workgroup of the plurality of workgroups is in the waiting state, waking up only a single workgroup of the plurality of the workgroups in response to the condition being met and in response to the plurality of workgroups being part of the high contention scenario indicating the mutual exclusion synchronization primitive; and scheduling a second set including more than one workgroup to be woken up after the updated estimated time.

2. The method of claim 1, wherein the monitoring includes monitoring accesses to a cache in which the condition variable is stored.

3. The method of claim 1, further comprising determining the estimated time of completion of the critical section by measuring a time period between detecting execution of the wait instruction and detecting that the condition is met.

4. The method of claim 1, further comprising:
detecting execution of a second wait instruction by a second workgroup, the second wait instruction specifying a second condition variable and a second condition to be met for the second condition variable;

in response to detecting that the second condition is met, determining that the second wait instruction is part of a non-high contention scenario, wherein the detecting that the condition is met comprises determining that a plurality of updates occur to the condition variable after the wait instruction is executed by each respective workgroup of the set of the workgroups; and in response to the second condition being met, and the second wait instruction being part of the non-high contention scenario, waking up each of the workgroups of a second set of the workgroups waiting on the second condition variable.

5. The method of claim 1, wherein the monitoring is performed by an advanced controller associated with a cache or cache bank in which the condition variable is stored.

6. The method of claim 1, wherein the second set participates in the synchronization primitive.

7. A system for scheduling on an accelerated processing device, the system comprising:
a compute unit executed by a processor configured to execute a plurality of workgroups, wherein each workgroup among the plurality of workgroups executed by the processor is configured to execute a wait instruction that causes each workgroup of the plurality of workgroups to be in a waiting state, wherein the wait instruction executed by each workgroup of the plurality of workgroups specifies a condition variable and a condition to be met for the condition variable, wherein the condition variable and the condition of the wait instruction are the same for each workgroup;
a workgroup scheduler executed by the processor configured to:

monitor the condition variable to detect when the condition is met;

in response to the condition being met as a result of only a single update to a condition variable after the wait instruction is executed by any workgroup of the plurality of workgroups, updating an estimated time of completion of a respective critical section associated with a synchronization primitive associated with the condition variable to completion of the critical section when the condition is met, and detect that the plurality of workgroups is part of a high contention scenario indicating a mutual exclusion synchronization primitive, while each workgroup of the plurality of workgroups is in the waiting state, wake up only a single workgroup of the plurality of the workgroups in response to the condition being met and in response to the plurality of workgroups being part of the high contention scenario indicating the mutual exclusion synchronization primitive; and schedule a second set including more than one workgroup to be woken up after the updated estimated time.

8. The system of claim 7, further comprising an advanced controller executed by the processor configured to monitor the condition variable by monitoring accesses to a cache in which the condition variable is stored.

9. The system of claim 8, wherein the advanced controller is associated with a cache or cache bank in which the condition variable is stored.

10. The system of claim 7, wherein the workgroup scheduler is configured to determine the estimated time of completion of the critical section by measuring a time period between detecting execution of the wait instruction and detecting that the condition is met.

11. The system of claim 7, wherein the workgroup scheduler is further configured to:
detect execution of a second wait instruction by a second workgroup, the second wait instruction specifying a second condition variable and a second condition to be met for the second condition variable;

in response to detecting that the second condition is met, determine that the second wait instruction is part of a non-high contention scenario, wherein the detecting that the condition is met comprises determining that a plurality of updates occur to the condition variable after the wait instruction is executed by each respective workgroup of the set of the workgroups; and in response to the second condition being met, and the second wait instruction being part of the non-high contention scenario, wake up each of the workgroups of a second set of the workgroups waiting on the second condition variable.

12. The system of claim 7, wherein the second set participates in the synchronization primitive.

13. A system for scheduling on an accelerated processing device, the system comprising:
a cache system having a cache controller;
a compute unit executed by a processor configured to execute a plurality of workgroups, wherein each workgroup among the plurality of workgroups executed by the processor is configured to execute a wait instruction that causes each workgroup of the plurality of workgroups to be in a waiting state, wherein the wait instruction executed by each workgroup of the plurality of workgroups specifies a condition variable and a condition to be met for the condition variable, wherein the condition variable and the condition of the wait instruction are the same for each workgroup; and a workgroup scheduler executed by the processor configured to:

monitor the condition variable to detect when the condition is met;

in response to the condition being met as a result of only a single update to a condition variable after the wait instruction is executed by any workgroup of the plurality of workgroups, updating an estimated time of completion of a respective critical section associated with a synchronization primitive associated with the condition variable to completion of the critical section when the condition is met, and detect that the plurality of workgroups is part of a high contention scenario indicating a mutual exclusion synchronization primitive, while each workgroup of the plurality of workgroups is in the waiting state, wake up a only single workgroup of the plurality of the workgroups in response to the condition being met and in response to the plurality of workgroups being part of the high contention scenario indicating the mutual exclusion synchronization primitive; and schedule a second set including more than one workgroup to be woken up after the updated estimated time.

14. The system of claim 13, further comprising an advanced controller executed by the processor configured to monitor the condition variable by monitoring accesses to a cache in which the condition variable is stored.

15. The system of claim 13, wherein the workgroup scheduler is configured to determine the estimated time of completion of the critical section by measuring a time period between detecting execution of the wait instruction and detecting that the condition is met.

16. The system of claim 13, wherein the workgroup schedule is further configured to perform operations comprising:

detecting execution of a second wait instruction by a second workgroup, the second wait instruction specifying a second condition variable and a second condition to be met for the second condition variable;

in response to detecting that the second condition is met, determining that the second wait instruction is part of a non-high contention scenario, wherein the detecting that the condition is met comprises determining that a plurality of updates occur to the condition variable after the wait instruction is executed by each respective workgroup of the set of the workgroups; and in response to the second condition being met, and the second wait instruction being part of the non-high contention scenario, waking up each of the workgroups of a second set of the workgroups waiting on the second condition variable.

17. The system of claim 13, wherein the monitoring is performed by an advanced controller associated with a cache or cache bank in which the condition variable is stored.

* * * * *